(12) United States Patent
Jenkins

(10) Patent No.: US 8,762,234 B2
(45) Date of Patent: Jun. 24, 2014

(54) DUTY AND TAX AVOIDANCE DEVICE AND SYSTEM

(76) Inventor: Mark Haydne David Jenkins, Nairobi (KE)

(*) Notice: Subject to any disclaimer, the term of this patent is extended or adjusted under 35 U.S.C. 154(b) by 670 days.

(21) Appl. No.: 11/717,415

(22) Filed: Mar. 13, 2007

(65) Prior Publication Data

US 2007/0299751 A1    Dec. 27, 2007

Related U.S. Application Data

(60) Provisional application No. 60/784,667, filed on Mar. 22, 2006.

(51) Int. Cl.
*G06F 17/22* (2006.01)
*G07F 19/00* (2006.01)

(52) U.S. Cl.
USPC ............................................... 705/31; 705/19

(58) Field of Classification Search
CPC ....... G06Q 40/10; G06Q 40/12; G06Q 30/04; G06Q 30/06
USPC ......... 380/270; 434/322; 705/1, 2, 31, 35, 39, 705/75; 707/100, 104.1
See application file for complete search history.

(56) References Cited

U.S. PATENT DOCUMENTS

| | | | |
|---|---|---|---|
| 6,298,333 B1 | 10/2001 | Manzi | |
| 7,184,978 B1* | 2/2007 | Tams et al. | 705/35 |
| 2001/0037250 A1 | 11/2001 | Lefkowitz | |
| 2002/0120527 A1 | 8/2002 | Lam | |
| 2002/0178039 A1* | 11/2002 | Kennedy | 705/7 |
| 2003/0093320 A1* | 5/2003 | Sullivan | 705/19 |
| 2003/0139985 A1* | 7/2003 | Hollar et al. | 705/30 |
| 2004/0128172 A1 | 7/2004 | Van Cleave | |
| 2004/0205017 A1* | 10/2004 | Lin et al. | 705/37 |
| 2004/0220884 A1 | 11/2004 | Khan | |
| 2005/0010431 A1 | 1/2005 | Uy | |
| 2005/0289036 A1 | 12/2005 | LaCombe | |

OTHER PUBLICATIONS

PCT—ISP—Mailing date May 16, 2008—8 pages.

* cited by examiner

*Primary Examiner* — Scott Zare
*Assistant Examiner* — Rokib Masud
(74) *Attorney, Agent, or Firm* — Frank B. Arenas, Esq.

(57) ABSTRACT

A device, system and method for duty and tax avoidance is disclosed for a computer-implemented process for converting import tax and duty cost on at least one vehicle/product/good from a taxable entity to a no-cost import tax and duty cost for a Tax Exempt Entity, identified as acronym TEE.

4 Claims, 7 Drawing Sheets

TOYOTA EAST AFRICA LIMITED
WORLD FOOD PROGRAME LEASED VEHICLES

STANDARD OPERATING PROCEDURES

A and B service / Repairs in South Sudan

DUTY AND TAX AVOIDANCE DEVICE AND SYSTEM

This Non-provisional application for patent incorporates by reference (to the extent that it does not conflict with the disclosure contained herein) and claims the benefit of pending Provisional Application having Ser. No. 60/784,667 filed 22 Mar. 2006 for "Duty and Tax Avoidance Device and System," commonly owned with the instant application.

BACKGROUND OF THE INVENTION

1. Field of the Invention

The present embodiments of invention relate generally to import duties and taxes and systems for avoidance of same. Some embodiments of the invention particularly relate to sales, payment, management, legal and accounting systems for selling, using, conveying and financing of vehicles, goods and products to entities inside one country with duty-free status (such as individuals, partnerships, corporations, United Nations (UN), World Food Program (WFP), Non-Governmental Organizations (NGO), etc.) from suppliers, providers, distributors and/or manufacturers outside of the country (importers) ("parties") and systems for avoidance of import taxes and duties from such transactions. Versions of the invention more particularly relate to computer-based devices, methods, processes and systems for the above-referenced transactions to produce useful, concrete and tangible results in the form of cash via tax and/or duty free leases/certificates to exempt importers from taxes normally levied by government taxation agencies. A Duty Free Synthetic Lease (DFSL) and Duty/Tax Free Certificate are also tangible results of the invention. Cash to the DFSL parties from the duty/tax savings is another tangible result of the invention. The DSFL is "synthetic" because it is not real but artificial. Versions of the invention may be used world-wide in at least one, some or any and all countries on all continents of the globe. Other embodiments of the invention include transactions within the same country and transactions outside the same country (export).

2. Description of the Related Art

As is well understood by one skilled in the art, for many years the global industry markets have had to deal with payment of taxes and/or duties to governments for importing goods and products such as aircrafts, motor vehicles, cars (automobiles), trucks, heavy equipment (cranes, bulldozers, backhoes, trenchers, excavators and the like), 4-wheel drive vehicles, motorcycles, 2-wheel drive vehicles, 1-wheel drive vehicles and all-wheel drive vehicles, portable buildings, trailers, etc. and all other usable vehicles, products and goods.

When the vehicles, products and goods arrive at a country's border, the main contact with the importers/owners/shippers is the government customs agent. This government customs agent inspects the products and goods to determine if they can be legally allowed into the country and to insure that import taxes and duties are paid on the vehicles, products and goods.

The import taxes and duties are then determined in relation to the value of the vehicles, products and goods at source. The importing country will then levy taxes and duties as determined by their import customs and excise policies and regulations (which vary widely from one country to another). These importing countries include, but are not limited to, United States of America, European Union countries, Canada, Central and South American countries, African countries, Asian countries, Middle Eastern countries and virtually all countries on all continents engaged in international trade. As is well known in the art, virtually all countries have "Trade Free Zones" and "Foreign Trade Zones" within the importing countries that contain bonded warehouses to store the imported vehicles/products/goods with "open title." The title is left open from the manufacturer until title is transferred to the importing entity after inspection and acceptance of the vehicles/products/goods by the importer. It is at the time of this title transfer that import taxes and duties are levied by the government of the host country.

In some countries (especially countries in Africa, for example) organizations such as the UN (United Nations), EU (European Union), diplomatic missions and certain NGO (Non Governmental Organizations) (herein referred to as "tax exempt entities" or "TEE") are given tax and duty free status by the country on vehicles, goods and products the TEE import and legally own for the time the TEE use the vehicles/goods/products. Some countries allow churches, religious organizations, charities and other types of non-profit entities to obtain tax and duty free status and thus become a TEE.

When these goods have been used and there is a desire to dispose of the vehicles/goods/products the TEE faces two choices. 1) If they can identify a suitable tax free entity or individual the vehicles/goods/products may be sold tax free to the suitable tax free entity provided all the necessary Government documentation governing that specific country is filled out and processed. 2) The vehicles/goods/products may be sold to an individual or entity which does not enjoy tax free status. In this instance the duties and taxes are calculated at the original tax free value of the vehicles/goods/products less depreciation determined by each individual government and then paid by the TEE in full before the vehicles/goods/products may be legally transferred to the entity that does not enjoy tax free status.

Previously in the art, the above customary method reduced or prevented the tax exempt entity from enjoying the benefits of leasing or renting services. Since ownership of the vehicles/goods/products to be leased/rented by the TEE was with a tax paying individual/entity whose vehicles/goods/products had been purchased with full tax assessed; therefore it may be economically unviable for the TEE to make the higher monthly payments based on budget restraints.

Over the years, the sales, billing, payment, financing, legal and accounting methods, systems and devices for calculating import duties and import taxes have burdened the global industry providers with loss of profit to the providers in the form of these taxes. In the import industry, however, there currently exists no medium of commerce device, methods and systems for sales, payment, financing, leasing, using or transferring products and goods for avoiding import duties, import taxes and Value Added Taxes (VAT). This new, useful and unobvious Duty Free Synthetic Lease (DFSL) and Duty/Tax Free Certificate address the problems of the import/export industry.

For instance, as an example, it is understood by one of ordinary skill in the art that the prior related art is as follows: Importer receives a request from a duty free entity (end user) located in Africa, for example, to lease a vehicle from importer (Vehicle Provider). Under common practice, the importer would import the vehicle in the importer's (Vehicle Provider's) name on the title as the owner. The lease contract would be from the importer (as Vehicle Provider/owner) as lessor to the end user as lessee. (Alternately, a middle man or Dealer may be included in the lease as an intermediary). The end user then pays lease (or rent) payments to the importer (Vehicle Provider or or middle man) for use of the vehicle. This importation of the vehicle subjects the importer to import duty and excise duty. Value Added Tax (VAT) are assessed on the lease/rent payments charged by the importer as it is here that the importer has added value. The TEE can apply for VAT exemption from the government and once they obtain this exemption they then hand over the forms to the importer who can now claim back the VAT payments he made/would have made. Therefore the main source of savings via the DFSL is on the administrative work reduction and duty paid on the vehicles. The lower price of the vehicle because of the DFSL results in less money borrowed from a Bank (if Bank financing is needed), with resulting lower periodic payments (daily, weekly, monthly or yearly, but typically monthly). The lower price because of the DFSL is then recovered through the vehicle use payments on which bank interest is paid to recover the principle sum and bank charges. In Kenya, for example, without the DFSL these import duties and taxes may lead to a doubling in the value of the vehicles purchase price which is then passed on to the TEE before the invention of DFSL was made. The importer is also levied with VAT on the Value Added Services rental payments received as rental service income. Additionally the importer would have to pay Income Tax on the rental charges since they are income from the end user.

The tax exempt entity or individual (TEE) therefore indirectly pays the taxes and duties for the importer, sometimes making it economically prohibitive to lease or rent in the methods of the prior related art. Should the end user/renter still require the vehicle they will therefore pay taxes and duties to operate in their field of operations. Take for example the UN World Food Program as a TEE; prior to this invention if the TEE did lease/rent a car to help with distribution of food in Sudan it can be argued that they were being taxed indirectly to help the starving by lease of the vehicle i.e. the function of the vehicle remains the same either tax and duty paid or tax and duty free. This innovation offers such organizations to access the benefits of a lease/rental without the tax and duty penalties usually assessed. This assists the TEE in their operations to improve efficiency and effectiveness in the field.

This new and useful device, system and method address this age-old problem of imposition on and payment of the above-referenced taxes and duties by the importer by creating a Duty Free Synthetic Lease (DFSL) document package. The embodiments of this invention of transforming a taxable transaction into a non-taxable transaction and creation of the new, useful, unobvious, tangible and concrete Vehicle Use Agreement (VUA) and Duty/Tax Free Certificate is unique and entails an inventive step in the state-of-the-art of the import/export industry. Cash savings to the importer is another tangible and concrete result of versions of the invention.

SUMMARY OF THE INVENTION

The present versions of the invention addresses at least one, some or all of the above-referenced needs in the art by providing a device, method and system to accomplish tax-free and duty-free transactions between importers and customers (End Users) across international borders. Versions of the invention may be used with all vehicles, goods and/or products contained in the U.S. Standard Industrial Classification (SIC) code, the Standard International Trade Classification (STIC) system and the Harmonized System (HS), all well known in the art. Other methods of classification of import/export articles are also well known in the industry and also be used with versions of the invention.

Benefits, features and problems solved by versions of the invention include: success in obtaining vehicles/products needed by the end user in spite of procurement budget restraints. For instance, usually budgets in UN/EU are fixed yearly. With the same budget for vehicles the TEE may approximately double their fleet size under the same budget allowing for greater flexibility and increased capacity by allowing the End User to enjoy the benefits of leasing and renting duty free.

Until these embodiments of the invention were conceived, this was not attainable, i.e. reducing budget restraints by spreading payments over the duration of the transaction due to lower acquisition costs created by the DFSL as part of the services offered by the lease providing vehicle financing. Versions of the invention improve relations with the local community for the End User by offering the local community the opportunity to purchase the vehicles duty paid at the end of the transaction term at much reduced rates of duties and taxes due to depreciation. Versions of the invention provide improved service/maintenance of the vehicles for the End User by use of commercial management and monitoring techniques. The vehicle is viewed as an asset by the importer/Vehicle Provider/Dealer and managed as a commercial project (pride of ownership) which differs from the Not for Profit approach taken by many. UN/NGO bodies will typically see cost savings in the region of 30% to the End User and increasing the life of the vehicles, goods and services generally threefold. It is understood that the End User is the Tax Exempt Entity (TEE).

Other benefits and features of the embodiments of the invention are reduced liability to the End User via Duty Free Insurance Coverage in areas of high risk (such as Africa), and a blanket fully comprehensive cover on the African continent allowing movement of the vehicles/goods/products across borders on the continent still under full insurance cover. More benefits include vehicle fleet management and tracking for the End User by the importer via satellite (and other types) of communications directly with the vehicle 24 hours per day. Improved safety is accomplished via a "panic button" installed in the vehicle to deploy a rescue team to the driver and vehicle (one embodiment can link the vehicle to the local military command and control network).

The Duty Free Synthetic Lease can reduce costs to the End User by financing of the vehicle by the importer rather than a lump sum payment; providing preventive service and maintenance during the use period by the importer, providing insurance premium payment/coverage by the importer, reduce administrative expenses and provide accurate and timely management reports to the End User by the importer. The DFSL may also provide crisis response to the End User by the importer, provide driver recruitment, training and salary to the End User by the importer and provide replacement vehicles to the End User by the importer.

It is an object of the invention to reduce and/or eliminate the payment of import taxes and import duties by importers into foreign countries on transactions for vehicles, goods and products.

It is another object of this invention to increase profits to the importers by the reduction and/or elimination of the payment of import taxes and import duties by importers into foreign countries by enabling a higher net price to the importers (or middlemen if used in the transaction) for the vehicles, goods and products since the taxes are reduced and/or eliminated.

It is another object of this invention to use entities that have tax-free and duty-free status (TEE) and provide innovative financing and fleet-management services of vehicles/equipment, saving taxes that would normally be assessed on the importer, since the importer usually does not have duty-free status. It is another object of the invention to provide a unique solution to transportation problems facing the United Nations and similar organizations. Yet another object of the invention improves efficiency, accountability and substantial reduction in overall cost to the End User.

At least one, some or all of the objects of this invention are addressed and the present invention provides a new and useful device, method and system for producing concrete, tangible and useful Duty Free Synthetic Lease (DFSL) document packages and concrete, tangible and useful Duty/Tax Free Certificates, accomplishing concrete and tangible increased cash profit for importers and/or reduced monthly payments for End Users.

The foregoing objects, benefits and advantages of versions of the invention are illustrative of those which can be addressed by versions of the invention and not intended to be limiting or exhaustive of the possible advantages that can be realized. These and other advantages will be apparent from the description herein or can be learned from practicing versions of the invention, both as embodied herein as examples or as modified in view of any variations which may be apparent to those of ordinary skill in the art. Therefore, the invention resides in the novel devices, methods, arrangements, systems, combinations and improvements herein shown and described as examples and not limited therein.

It is understood that the device, system and method typically provide the following to accomplish versions of the invention, (using a vehicle as an example and not intended to be limiting in the scope of the invention) the Duty Free Synthetic Lease (DFSL) document package and Duty/Tax Free Certificate ("document package"), comprising the following:

1. Vehicle Use Agreement (VUA). The VUA is usually triparty (may be bi-party or multi-party, depending on the exact circumstances) agreement between the Vehicle Provider (also referred to as importer or product supplier), the End User and optionally the Dealer (also commonly referred to as middle man) providing the vehicle/plane/good/product and optional financer (also referred to as bank). The VUA may be long-term (more than one year of usage) or short-term (less than one year of usage). A sample long-term Vehicle Use Agreement (VUA) will be more fully explained in the description of the preferred embodiment. It also details the other documentation ("document package") covered in the VUA such as;
2. Schedule A details all financial arrangements, accessories, use options, vehicle details, service details, replacement vehicle charges, agreed residual and most importantly A NOTICE OF ASSIGNMENT ASSIGNING THE LEGAL RIGHTS OF THE VEHICLE TO THE BANK AND/OR THE VEHICLE PROVIDER;
3. Vehicle return conditions—this form indicates the conditions under which the vehicle must be returned. Should the vehicle not be in a suitable condition as per this document it is a legal requirement as per the VUA that the End User covers the costs to have the vehicle meet the required return conditions;
4. Fleet Service Contract (FSC). This document is signed by the End User and the Vehicle Provider providing the vehicle/plane/good product to ensure that the service and maintenance expectations are clearly laid out and understood and may include a schedule of repair and maintenance. A typical FSC will be more fully disclosed in the description of the preferred embodiment;
5. Insurance policy for the vehicles;
6. Original Log book of the vehicles;
7. Signed transfer form for the vehicle/log book;
8. Signed delivery note;
9. Possible optional additional documentation to cover service and maintenance extra charges and procedures in remote areas such as South Sudan, for example, where mechanics may be required to fly into the field to repair vehicles outside the agreed service centers as per the VUA;
10. Duty/Tax Free Certificate.

Basically, the VUA agreement (generated by hand, computer or other suitable means) is signed by the parties concerned as well as all the above documentation except for the log book. The Duty free entity/organization (TEE) then processes all the necessary paperwork to ensure that they acquire the log book from the host country. Then this is transmitted to the Vehicle Provider with the transfer forms duly signed. This enables the Vehicle Provider (VP) to now obtain financing from the banks (if needed or desired) and order the vehicles, for example, and pay for the same with the receipt issued from the Vehicle Provider supplying the vehicles/planes/goods/services in the name of the VP indicating "on behalf of (TEE) the duty free entity concerned." Vehicles are then distributed as per the TEE needs and accessory list in Schedule A and delivered to the TEE which sign-off the relevant delivery forms and the VUA commences. Invoices are submitted by the VP typically monthly (monthly invoices) to the duty free entity (TEE) for payment and the TEE also processes VAT exemption forms for the VP to submit with annual tax returns to the respective country's government at the end of the year.

With regards to a short-term VUA (rental under the prior related art), the idea and process is much the same with a long-term VUA agreement form used with the vehicles once again being purchased on behalf of the duty free entity (TEE). The main difference is that the long-term VUA is more of a long term agreement (typically longer than a year) which will typically see the monthly costs associated with the transaction lower than the short-term VUA (rental under the prior related art) costs. A short term VUA (anything from 3 days to one year) is available which many TEE require as they are on short term contracts. Also, in a long-term VUA (lease under the prior related art) if there is an accident all accident costs are covered, under a short-term VUA (previously rent), dependant on the insurance taken out the entity using the vehicle may be asked to pay insurance excesses. Also, in some instances there is an option for the TEE to buy the vehicle with the long-term VUA; generally with a short-term VUA this is not an option, but could be.

Features of the invention can be implemented in several ways, including as an apparatus, kiosk, device, PC (personal computer), form, system, a method and/or computer readable media having code devices for implementing the methods of the invention and producing a DFSL and document package to be used by government custom agents, TEE and the importers to avoid import taxes and duties. The invention preferably includes a computer infrastructure, wherein DFSL forms (document package) and/or certificates can be achieved. Several embodiments of the invention are discussed below. The invention can be implemented in other ways, including as a system (including a computer processing and/or database system), a method (including a computerized method of constructing a tree data structure and a method for evaluating queries), an apparatus, a device, a computer readable medium, a computer program product, a web site on the Internet/World Wide Web (WWW) and/or a data structure tangibly fixed in a computer-readable memory.

As a COMPUTER SYSTEM, an embodiment of the invention includes a database containing tables of data (for example, import duty/tax costs for various countries in the world), a display device and a processor unit. The display device has a plurality of display areas (windows). The processor unit operates to access the database to retrieve the data from the corresponding associated tables and then display the retrieved data in the display areas.

As a GRAPHICAL USER INTERFACE (GUI) for a display screen of a computer, an embodiment of the invention includes a number of display areas ("windows") for searching and displaying data. A variety of formats for searching and displaying data is provided. Searches can be performed by many parameters that are more fully disclosed below. Search results are graphically, textually and/or numerically displayed showing needed information pertinent to the import/export business and industry.

As a METHOD of displaying data on a display device of a computer system, the data being obtained from a relational database associated with the computer system, the display having "windowing" capability to provide a plurality of display areas, an embodiment of the invention includes the operations of sales in foreign countries. The method further includes Internet, (World Wide Web, WWW), wireless or wired phone systems for sales and payments to a remote importer by a remote customer in another country, for example at the importing country's border, customs office or other location in the importing country.

As a COMPUTER READABLE MEDIA containing program instructions for displaying data on a display device of a computer system, the data being obtained from a relational database associated with the computer system, the display having "windowing" capability to provide a plurality of display areas, an embodiment of the invention includes computer readable code devices for operator input, manipulation and output. The invention's database and transmission of data may also include an encryption means and password access to prevent access or interception from unauthorized users.

The methods of the present invention may be implemented as a computer program product with a computer-readable medium having code thereon. The program product includes a program and a signal bearing media bearing the program.

As an APPARATUS or DEVICE, the present invention may include at least one processor, a memory coupled to the processor, and a program residing in the memory which implements the methods of the present invention via a communication means. For example, the apparatus may include a remote input device (such as PC, cell phone, smart phones, RFID, 3G third generation mobile network technology device, Palm Inc.'s TREO 700W, PDA, EDGD enhanced data for global evolution and 1xRTT devices, Sprint PPC-6700 "smart device" with Windows Mobile 5.0 with broadband access, or Verizon wireless "multimedia phone" model LG VX9800 with broadband access, and other-type "smart devices" for example) with a sufficient amount of computer hardware, software, peripherals and necessities outside the importer's office capable of communicating with at least one computer with a sufficient amount of computer hardware, software, peripherals and necessities inside the importer's office, at least one database accessible to the computer and the remote input device, a means for communicating in delayed-time or real-time between the remote input device and the host computer and a means for communicating in between the host computer and a credit card, payment authorization and/or approval source, bank and/or other medium of commerce for any payment type from End User acceptable to importer for payment of the monthly invoices.

The computer may also include a computer network accessible to and in communication with a plurality of computers, either wired or wireless. The computer may be a laptop. The data and means for communication may be encrypted or un-encrypted (plaintext or ciphertext).

BRIEF DESCRIPTION OF THE DRAWINGS

In the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 1:
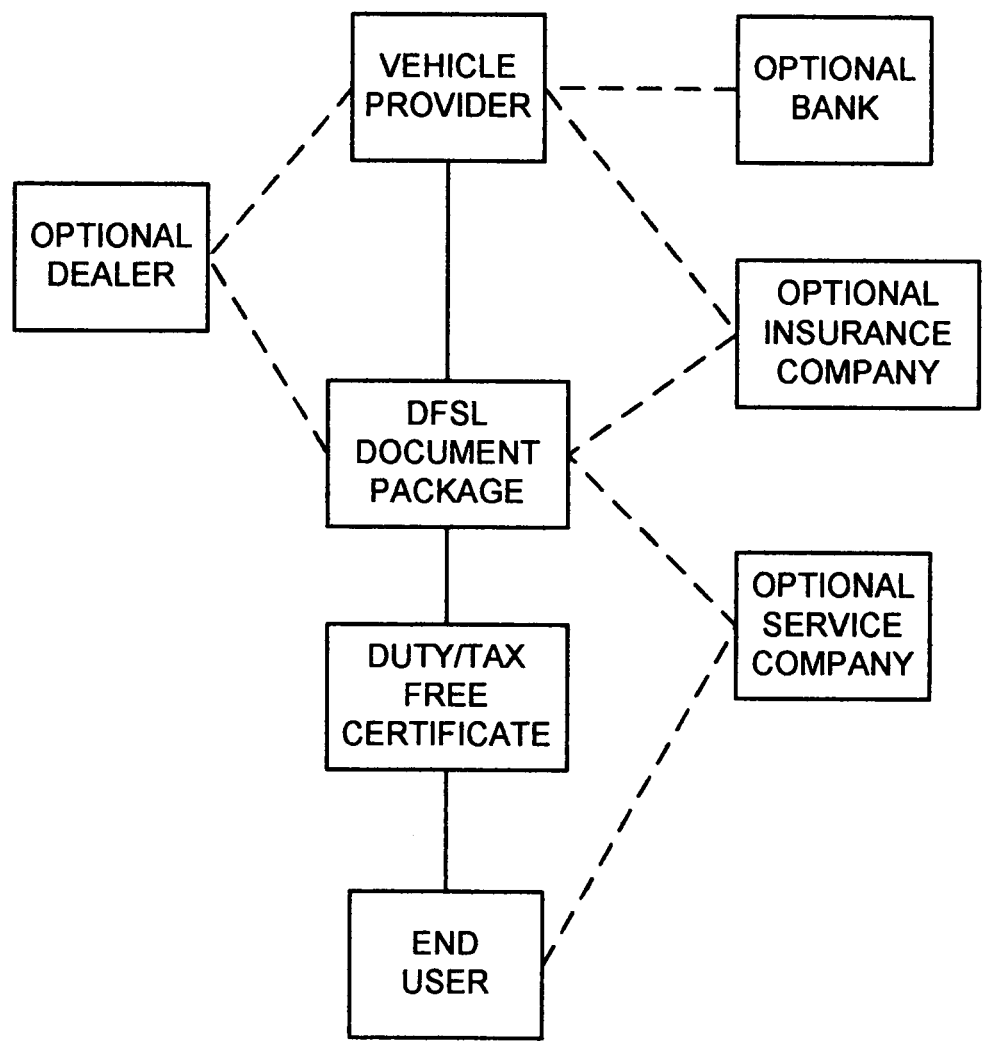
FIG. 1 is a schematic drawing of the interaction of the Vehicle Provider and End User via the DFSL apparatus and system components and optional Bank, Dealer, Insurance Company and Service Company.

It should be understood that in certain situations for reasons of manual or computational efficiency or ease of maintenance, the ordering of the blocks of the illustrated flow charts could be rearranged or moved inside or outside of the illustrated loops by one skilled in the art. While the present invention will be described with reference to the details of the embodiments of the invention shown in the drawings (and some embodiments not shown in the drawings), these details are not intended to limit the scope of the invention.

DETAILED DESCRIPTION OF THE PREFERRED EMBODIMENT

The core of the versions of the invention is the purchase of vehicles by the importer in the name of the duty free entity (TEE) and then allowing use of the vehicles to the same duty free entity for a fee. The fee payment is considered a loan repayment which exempts the fee from normal taxes if the transaction were a straight lease from importer to End User (hence defined as a "synthetic" lease, i.e. not real but artificial). This innovative device, system and method provides the following tax advantages to the importer: 1) avoidance of import duties, excise duties and VAT (Value Added Tax) by the importer; 2) avoidance of VAT on rental service, since the fees paid to the importer are not lease payments (since the End User has title to the vehicle, they cannot possess by virtue of a lease what they already posses by virtue of ownership rights); 3) The fee to the importer is structured as a repayment of a loan to the End User(s), thereby eliminating the income tax on rental/lease payments received by the importer.

The tangible and concrete cash savings to the Vehicle Provider (VP) and End User are substantial using versions of the invention. For example, a new Toyota Land Cruiser Prado (Model KZJ120R) imported into Kenya would cost $7,385 US Dollars (USD) per month under the prior art but cost only $4,485 USD using a version of the instant invention. This is a direct result of a version of this invention reducing the typical acquisition cost of the new Prado from $57,863 USD (duty-paid) to $34,391 USD (duty-free). The savings of versions of the invention may be kept 100% by the Vehicle Provider or given 100% to the End User or split the savings in any proportion desired by the parties; i.e. 20% to the VP and 80% to the End User or any other arrangement agreed by the parties. (This is explained in much detail by the Briefing Memorandum attached hereto to these specifications and adopted and incorporated by reference herein.) The above example is merely for illustration to understand uses of some versions of the invention and not intended to be limiting in any way for other uses.

The apparatus, system and method of using the invention will now be further described and exemplified by reference to the various specific embodiments set forth in the drawings. FIG. 1 depicts in symbolic form the system components and the interaction of the Vehicle Provider and End User (and optional Dealer, Bank, Insurance Company and Service Company) in the preferred embodiment and best mode, which will now be explained.

Figure 3:
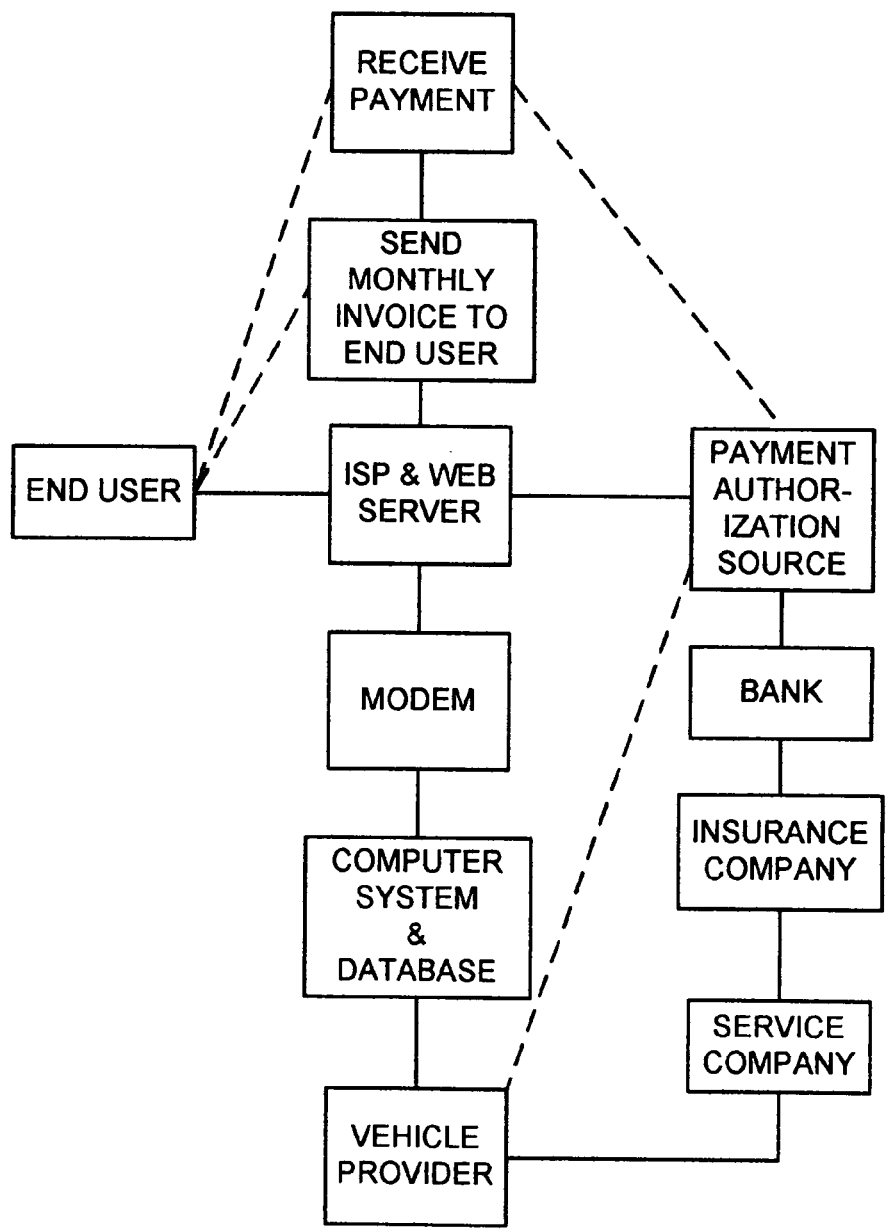
FIG. 3 is a schematic drawing of the web site interaction with an end user and payment of monthly invoices.

For example, FIG. 3 shows schematically a WWW system components; all vehicles/products/goods are based per vehicle/products/goods unit sold (per vehicle, per aircraft, etc. or other user-defined criterion). The customer type, vehicle/product/good type and payment type of the invention may be any user/operator-defined criterion. User/operator-defined criterion is hereby defined as types of customers, vehicles, products, goods, purchases, loans, fees, insurance charges, financing, service charges and/or payments or categories (modified or unmodified by other attributes) as defined by the user or operator of the apparatus, system and method of the invention. All communications and means of communicating concerning the invention are either one-way (i.e. able to transmit or receive only) or two-way communications (i.e. able to transmit and receive data), or both, as needed alone or in combination.

The invention may input/output data manually or via email, voice recognition, facsimile, scanner, printer and/or interact with independent outside vendor word processing software (such as Word or WordPerfect) and/or spreadsheet/database software (VisiCalc, Lotus, Microsoft Office, etc., QuickBooks, for example) for output-accounting and/or via a printer. Software used for versions of the invention may programmed in Microsoft Visual Basic, VB.Net, Delphi, Embedded Visual Basic, Embedded Visual C++, Turbo Pascal, C#, CE.NET or any other programming tool.

Referring now to FIG. 3, payments by the TEE to the Vehicle Provider per the monthly invoices for use fees may be made via payment authorization and approval sources or via credit cards (or other medium of commerce, i.e. "pay orders" and "funds transfer" per U.C.C. Article 4A, for example) and customer (End User) payment(s) may be via modem/phone line, Internet/WWW (World Wide Web), corporate intranets, commercial networks, electronic funds transfer networks, telecommunications networks, satellite means, radio means, fiber optic cable, cablegrams, cell phone, smart phone, smart device or any other suitable medium of commerce, wired or wireless, alone or in combination. All data transmitted and received between the remote input device and host computer and/or between the host computer and/or credit card payment authorization and approval source (or other medium of commerce) may be encrypted or un-encrypted as the user desires. Payment for monthly invoices/use fees may be made by remote customer by cash, ATM, credit card, debit card, smart card, check, electronic funds transfer (EFT), bank wire transfer, commercial account or any other type value acceptable for payment to the importer. All customer types, vehicle/product types, purchase types and payment types may be based on any user-defined criterion as desired by the system's user/operator.

A customer may request any or all of the type vehicles/products or goods (including options if desired). Thus, it is understood herein, "vehicles/products and/or goods" is hereby defined as any or all of at least one unit or partial unit of the type vehicle(s), product(s) or good(s) offered by the importer. It is also understood that whenever and/or is used in this patent application it means any combination or permutation of all, one, some, a plurality or none of each of the item or list mentioned, which is not intended to be limiting but merely for example and illustration. It is also understood that (s) designates either singular or plural. It is also understood that that "or" is an inclusive "or" to include all items in a list and not intended to be limiting and means any combination or permutation of all, one, some, a plurality or none of each of the item or list mentioned. It is also understood that "including" means "including but not limited to" any combination or permutation of all, one, some, a plurality or none of each of the item or list mentioned.

FIG. 3 depicts a schematic of the apparatus, method and system in operation relative to the components. For monthly invoices, bank payment authorization and approval source(s) may automatically accesses a card merchant authority and approval verification (via phone land line, Internet, radio, cell phone, satellite or any other transmissions means) and obtains authorization for vehicle use payment of monthly invoices. Another embodiment uses digital signatures to obtain customer's signature. Other optional hardware/software may be used with the invention such as digital camera, video camera, bar code scanner, microphone, speakers, digital scanner and other computer accessories and/or input/output devices, all well known in the industry.

To make the invention in its preferred embodiment, one skilled in the art would assemble, install and connect appropriately at least one, some or all the following components in the ordinary and customary practice of the art (all owner's manuals, user's manuals, technical specifications and/or other printed documents available concerning the following hardware and/or software, components, peripheral devices, accessories and/or necessities are hereby incorporated by reference): The computer, if used, may be any suitable-type platform such as PC, MAC, laptop, but the preferred hardware includes a personal computer (PC) or laptop computer which is a 100% IBM-compatible machine (with typical monitor, keyboard, etc.) with a Pentium processor or higher; a hard disk with at least 20 MB free space; a CD Rom Drive; a Mouse; 256 megabyte of memory (RAM); an EGA, VGA, 8514, Hercules, or compatible display; and a multitasking operating system (OS) such as Microsoft Windows or DOS, VMS, OS/2, UNIX, LINUX or any other suitable OS.

Alternately, the computer could be a computer server with the above-referenced hardware and appropriate server-software (SQL, APACHE, etc.) and/or HTML (Hypertext Markup Language) and/or XML (Extensible Markup Language) for an interactive World Wide Web (WWW) site URL (Universal Resource Locator) located at an Internet Service Provider (ISP) third-party location via TCP/IP or even a private TCP/IP network. Access to the web site may be made via web browsers such as Firefox, Mozilla, Netscape, Internet Explorer, etc. or any other suitable communication means. These browsers may be used alone or with integrated or stand-alone email programs such as Outlook Express, etc. or any other communication means, such as smart phones, multimedia phones and/or smart devices, well known to one skilled in the art. All software is coded and installed according to the developer's or manufacturer's instructions, procedures and specifications. The above-referenced illustrative computer hardware/software is hereinafter referred to as a "computer system" and is for illustration only and not intended to be limiting as to what hardware/software (or virtual hardware) that may be used to practice the versions of the invention. In one embodiment, the device, process, method and/or system performs all steps or functions and are accomplished automatically without human intervention. In another embodiment, the device, process, method and/or system performs all steps or functions and are accomplished automatically with some human intervention. In another embodiment, the device, process, method and/or system performs all steps or functions and are accomplished automatically with minimal human intervention.

The development and proliferation of GUIs has greatly enhanced the ease with which users interact with databases both in the searching stage and in the display of information. A conventional GUI display includes a desktop metaphor upon which one or more icons, application windows, or other graphical objects are displayed. Typically, a data processing system user interacts with a GUI display utilizing a graphical pointer, which the user controls with a graphical pointing device, such as a mouse, trackball, or joystick. For example, depending upon the actions allowed by the active application or operating system software, the user can select icons or other graphical objects within the GUI display by positioning the graphical pointer over the graphical object and depressing a button associated with the graphical pointing device. In addition, the user can typically relocate icons, application windows, and other graphical objects on the desktop utilizing the well known drag-and-drop techniques. By manipulating the graphical objects within the GUI display, the user can control the underlying hardware devices and software objects represented by the graphical objects in a graphical and intuitive manner.

User interfaces used with multi-tasking processors also allow the user to simultaneously work on many tasks at once, each task being confined to its own display window. The interface allows the presentation of multiple windows in potentially overlapping relationships on a display screen. The user can thus retain a window on the screen while temporarily superimposing a further window entirely or partially overlapping the retained window. This enables the user to divert the attention from a first window to one or more secondary windows for assistance and/or references, so that overall user interaction may be improved. There may be many windows with active applications running at once. Oftentimes, the windows may be (dynamically or statically) related such that modifying a query in one window results in changes to the displayed data in the other related windows, thereby "propagating" the changes throughout.

Figure 2:
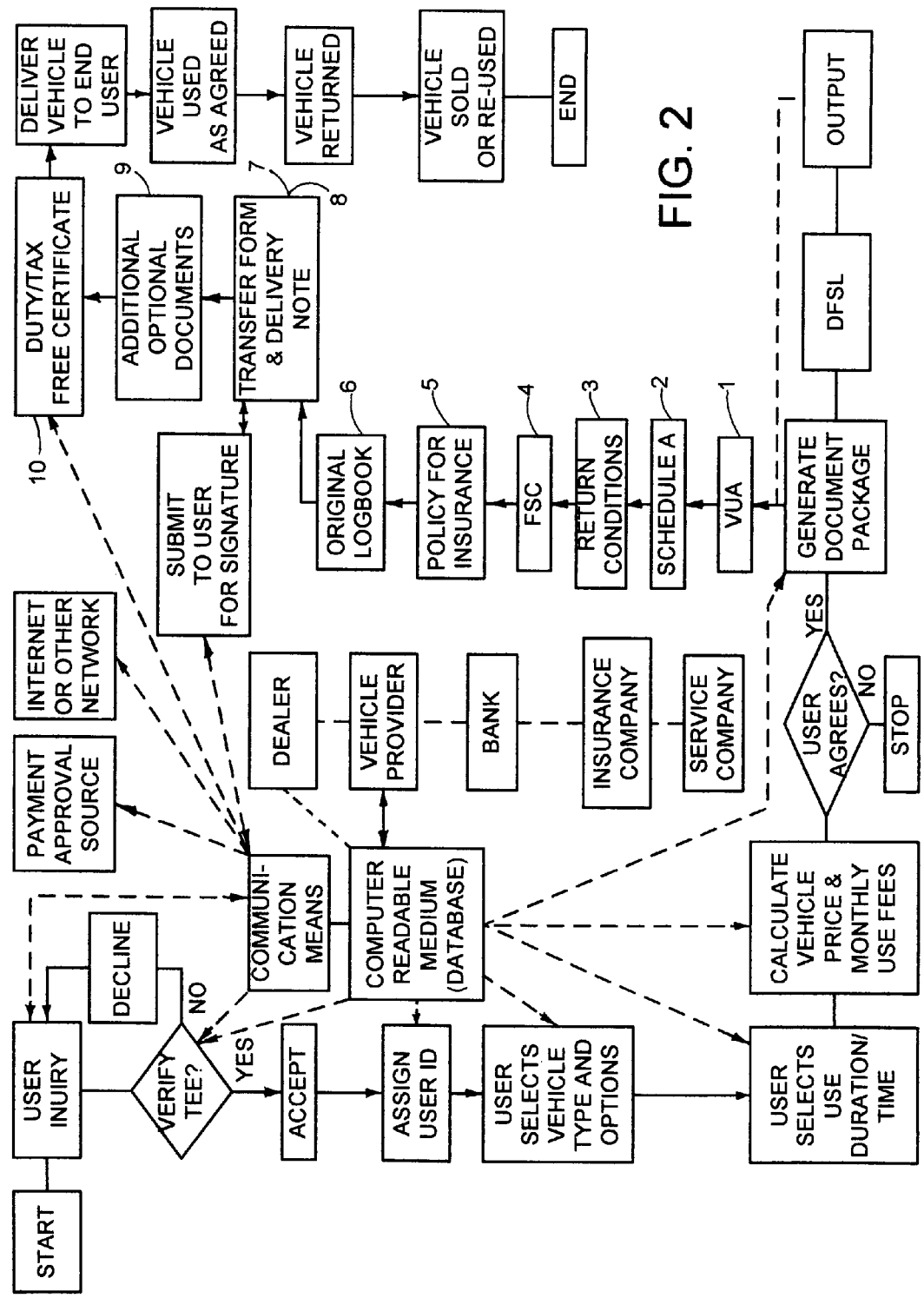
FIG. 2 is a schematic drawing of a typical transaction.

With one, some or all of the above components, one skilled in the art would proceed as follows for best mode of the preferred embodiment, which is shown for illustrative purposes only and not intended to be limiting (as shown in FIG. 2):

(A vehicle is used for an example). A Web site is established on the WWW by the importer via an ISP (Internet Service Provider) using HTML, XML or any other suitable programming language. The web site home page is an inquiry electronic form page. The duty-free customer (End User—TEE) enters their UN (United Nations)/NGO (Non Governmental Organization)/WFP (World Food Program) details to access the system (via a web browser or any other suitable communication means). The importer verifies the information and if accepted by the importer, the End User is given a membership number to ensure confidentiality of the information exchanged. The End User then enters on the members-only web page via menus and text input into electronic forms what is needed as to type of vehicle, location, duration of use, option extras and other desired information ("provisions"). The DSFL and document package provisions may define and agree to the choice of law of any desired country, choice of venue in any desired country for disputes, etc. The document package may make the DSFL enforceable in any country, even if different from the country of use of the vehicle/product/good if desired by the parties. For instance, the provisions may designate the United States as the choice of law, venue, legal enforceability remedies, and intellectual property rights between the parties, regardless of physical location of the parties.

Figure 4:
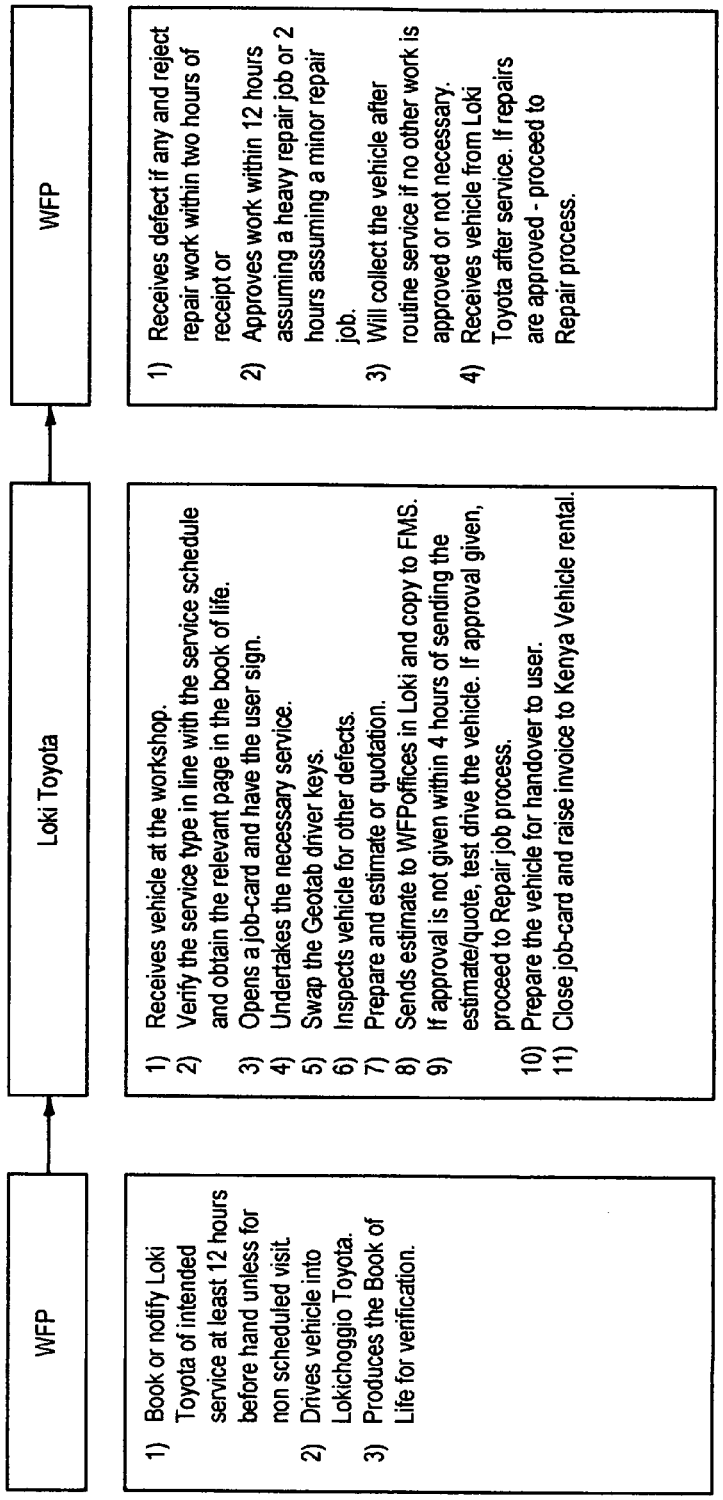
FIG. 4 is a schematic drawing of the typical vehicle service standard operating procedures for repairs within Kenya, for example.
Figure 5A:
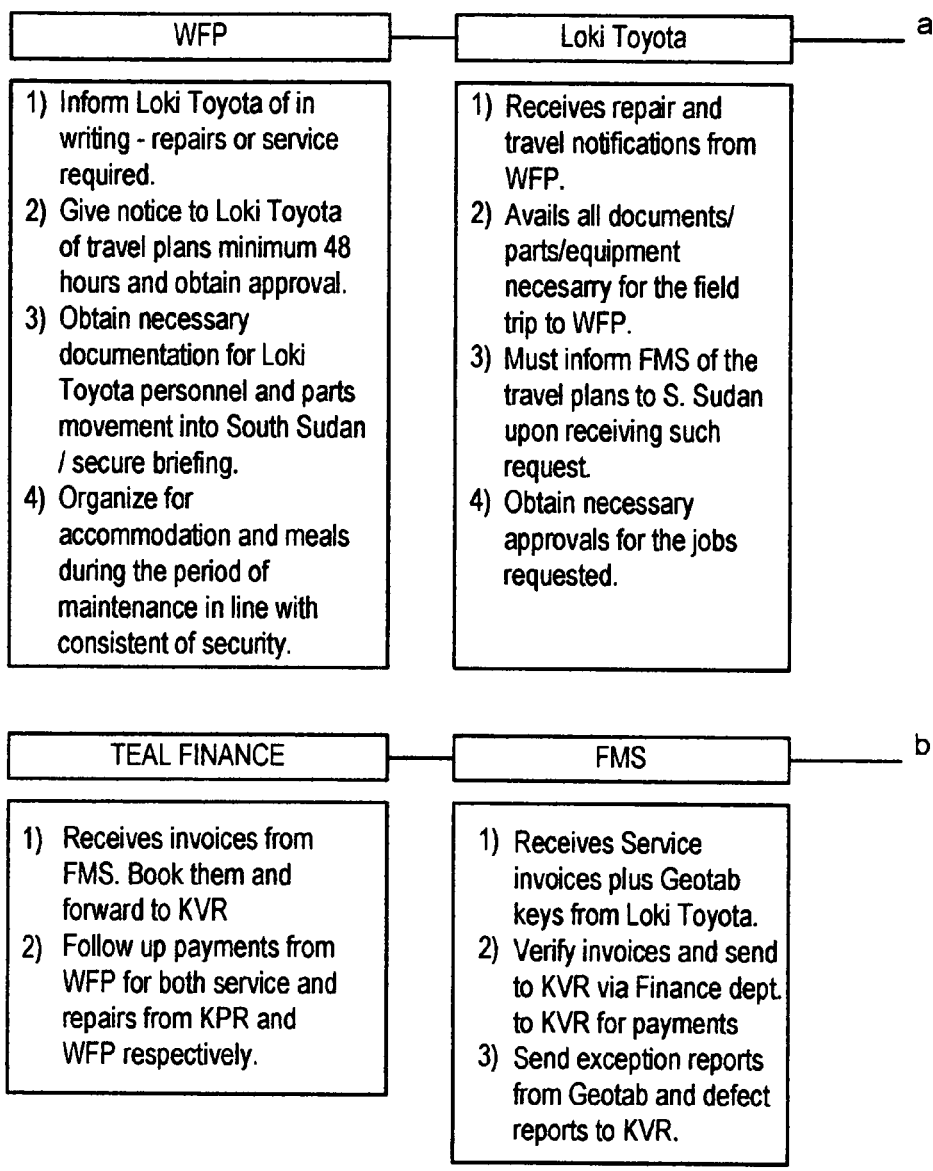
FIG. 5 is a schematic drawing of the typical vehicle service standard operating procedures outside of Kenya with repairs needed in South Sudan, for example.
Figure 5B:
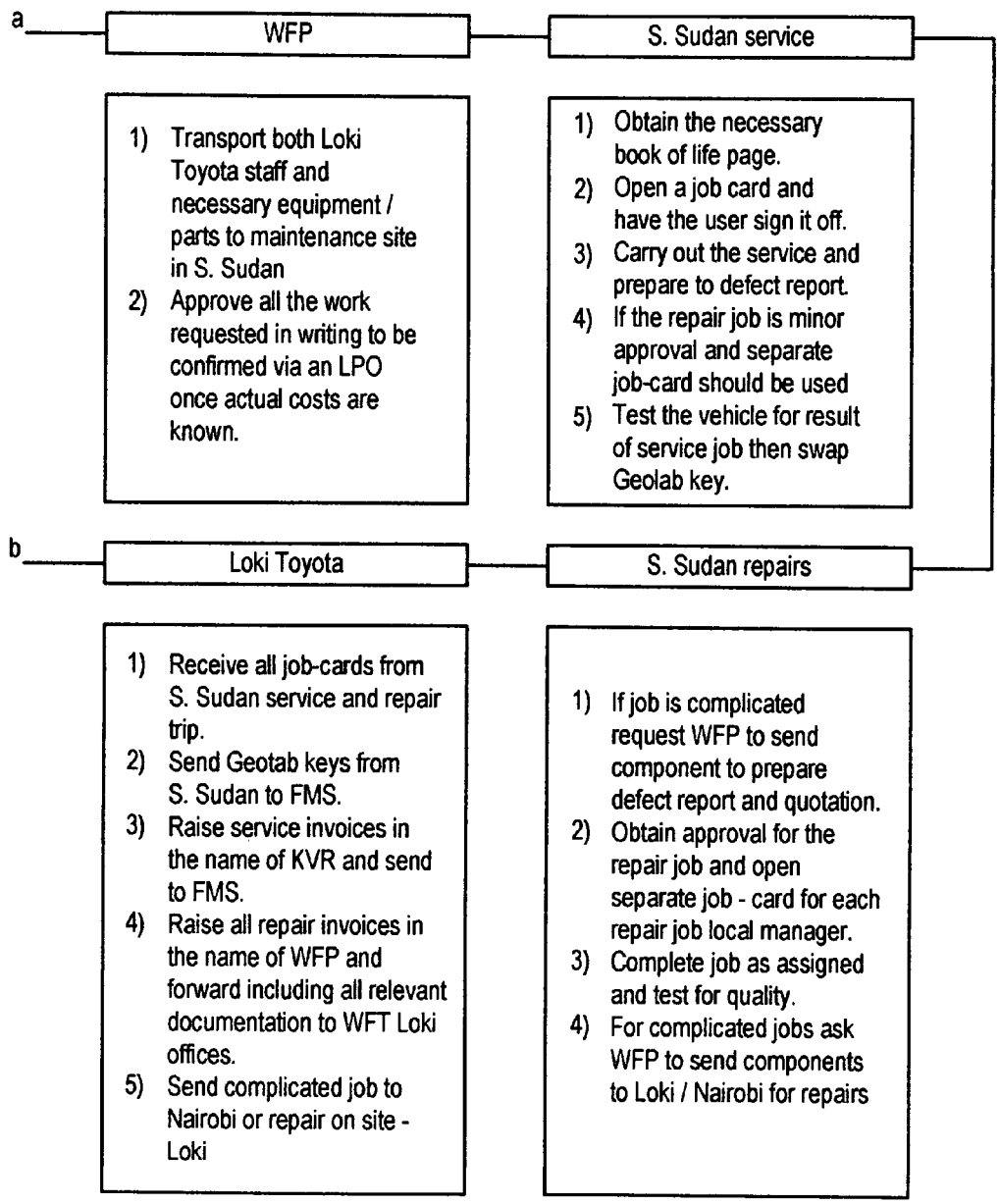
Figure 6:
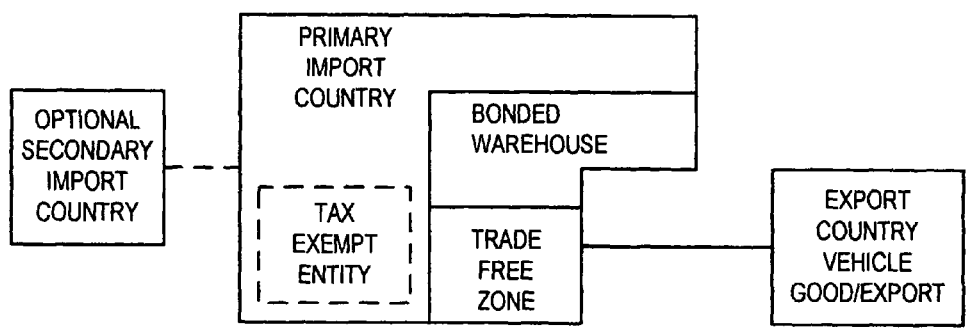
FIG. 6 is a schematic of the export country, trade free zone and import country.

The procedures for the use, navigation, input of data and interaction with the web site are well known in the industry such as point-and-click on hyperlinks with a computer mouse computer input device, filling in electronic forms, sending/receiving email, speaking to the web site and listening to the web site via Voice over Internet Protocol (VoIP) The End User may communicate in question and answer format via a voice synthesizer connected to a processor. The web page input data is evaluated by the importer. The input data may be stored in computer memory. The importer communicates (via email, preferably, but by any communication means) to the End User an estimate of applicable costs and/or other fees/charges and time for delivery. A follow-up contact (via phone, facsimile, email or any other type communication means) is made by the importer to the potential End User. If the End User elects to proceed with the transaction, the DFSL formal paperwork (document package) is generated by the importer (VUA, local purchase order (if desired), import/export form/contract assigning the vehicle back to importer, etc., the "document package"), typically using off-the-shelf word processing and/or spreadsheet software commonly available and well known in the industry. FIG. 4 and FIG. 5 show a typical document package service standard operating procedures for vehicle repairs for a vehicle used and repaired in Kenya and a vehicle based in Kenya but used and repaired in South Sudan, for example.

Once accepted by the Vehicle Provider and End User, then the parties execute the following previously described document package (a preferred embodiment of the provisions in the document package adapts to the specific needs of the Vehicle Provider, End User and any other optional entity such as Dealer, Bank, Insurance Company, Service Company and others, if desired, either alone or in combination) that comprises the DFSL;

1) Vehicle Use Agreement (VUA);
A typical VUA is as attached as Appendix A (for illustration only and not intended to be limiting). A preferred embodiment of the VUA adapts to the specific needs of the Vehicle Provider, End User and any other optional entity such as Dealer, Bank, Insurance Company, Service Company and others, if desired, either alone or in combination.

2) Schedule A and Notice of Assignment;
A typical Schedule A and Notice of Assignment is as attached as Appendix B (for illustration only and not intended to be limiting). A preferred embodiment of the Schedule A and Notice of Assignment adapts to the specific needs of the Vehicle Provider, End User and any other optional entity such as Dealer, Bank, Insurance Company, Service Company and others, if desired, either alone or in combination.

3) Vehicle Return Condition Agreement;
A typical Vehicle Return Condition Agreement (VRCA) is as attached as Appendix C (for illustration only and not intended to be limiting). A preferred embodiment of the VRCA adapts to the specific needs of the Vehicle Provider, End User and any other optional entity such as Dealer, Bank, Insurance Company, Service Company and others, if desired, either alone or in combination.

4) Fleet Service Contract (FSC);

A typical Fleet Service Contract (FSC) (also called a Maintenance Service Agreement) is as attached as Appendix D (for illustration only and not intended to be limiting). A preferred embodiment of the FSC adapts to the specific needs of the Vehicle Provider, End User and any other optional entity such as Dealer, Bank, Insurance Company, Service Company and others, if desired, either alone or in combination.

5) Insurance Policy;

A typical Insurance Policy is as attached as Appendix E (for illustration only and not intended to be limiting). A preferred embodiment of the Insurance Policy adapts to the specific needs of the Vehicle Provider, End User and any other optional entity such as Dealer, Bank, Insurance Company, Service Company and others, if desired, either alone or in combination.

6) Original Log Book;

A typical Original Log Book is as attached as Appendix F (for illustration only and not intended to be limiting). A preferred embodiment of the Original Log Book adapts to the specific needs of the Vehicle Provider, End User and any other optional entity such as Dealer, Bank, Insurance Company, Service Company and others, if desired, either alone or in combination. The exact embodiment of the Original Log Book may be required by the laws of the country in which it is used.

7) Transfer of Ownership Form;

A typical Transfer of Ownership Form (TOF) is as attached as Appendix G (for illustration only and not intended to be limiting). A preferred embodiment of the Transfer of Ownership Form adapts to the specific needs of the Vehicle Provider, End User and any other optional entity such as Dealer, Bank, Insurance Company, Service Company and others, if desired, either alone or in combination. The exact embodiment of the TOF may be required by the laws of the country in which it is used.

8) Delivery Note;

A typical Delivery Note is as attached as Appendix H (for illustration only and not intended to be limiting). A preferred embodiment of the Delivery Note adapts to the specific needs of the Vehicle Provider, End User and any other optional entity such as Dealer, Bank, Insurance Company, Service Company and others, if desired, either alone or in combination.

9) Possible additional documentation may be needed for the DFSL document package. A preferred embodiment of the additional documentation adapts to the specific needs of the Vehicle Provider, End User and any other optional entity such as Dealer, Bank, Insurance Company, Service Company and others, if desired, either alone or in combination. This additional documentation may cover communication/security and related equipment/services or extended service/maintenance in remote areas. A typical additional document such as Comprehensive Cover to provide more insurance coverage than standard and option to include StarTrack, which is a vehicle tracking system to help recover the vehicle in event of loss. A typical Comprehensive Cover is as attached as Appendix I (for illustration only and not intended to be limiting).

10) After the execution of the above documents in the DFSL document package, the object of the invention, the Duty/Tax Free Certificate, is then achieved. A preferred embodiment of the Duty/Tax Free Certificate adapts to the specific needs of the Vehicle Provider, End User and any other optional entity such as Dealer, Bank, Insurance Company, Service Company and others, if desired, either alone or in combination. The exact embodiment of the Duty/Tax Free Certificate may be required by the laws of the country in which it is used.

A typical Duty/Tax Free Certificate follows:

Duty/Tax Free Certificate

Be it known to all interested and concerned parties, that the following vehicle, Vehicle Identification Number (VIN) #_____ is titled in the name of a bona fide Tax Exempt Entity (TEE) _____ and as such is entitled under the laws of this country to be imported duty free and tax free into this host country. Any questions or inquiries regarding the propriety of this Certificate may be to the TEE at the following contact Phone/Facsimile/Address: _____

Seal of the above-referenced TEE:

Once these documents are signed, delivered and presented to the host government of the host country to obtain duty and tax free status for the vehicle by the TEE, the importer then typically obtains the vehicle from a bonded warehouse in the host country's trade free zone or foreign trade zone (such warehouses and zones are well known in the import/export industry) or imports a vehicle from the country of manufacture or storage—i.e. Japan (or any other country) with the TEE as owner on the title. Prior to releasing the vehicle from the bonded warehouse, the vehicle is titled in the TEE's name, thereby accomplishing the objective of the invention as previously discussed in conjunction with the document package.

The system accomplishes what would normally be a taxable transaction (import by the importer of goods/products in the importer's name) and transforms it into a non-taxable transaction by conveying title from the importer (a taxable entity) to the End User (tax-exempt entity). This is contrasted to the transaction as is customary in the industry for the importer to keep the vehicle in the importer's name, import the vehicle to the country and pay associated taxes/duties. Other embodiments of the invention include taking the vehicle to another country at the end of the DFSL and/or use/sold/rented to another EET within the same country.

The above-referenced menus, lists, options, functions, instructions, commands, sub-commands, applications, interactions, items, products, goods, groups and sub-groups are merely intended as illustration and examples, and are not intended by the inventor to in any way limit the addition, deletion or modification of any said menus, lists, options, functions, instructions, commands, sub-commands, applications, interactions, items, products, goods, groups and sub-groups as might be desirable or useful to someone skilled in the art.

Some examples of embodiments of the invention may be illustrated. For example the invention may be practiced with a laptop computer and/or kiosk comprising sufficient hardware, software, accessories and peripheral devices; word processing (or spreadsheet) software with preconfigured forms for input of Vehicle Provider, End User and other optional entities' data to generate output of the DFSL document package and Duty/Tax Free Certificate via a printer, facsimile, cell phone, smart phone and/or email or other tangible form.

Or, the invention may be practiced with a computer system in communication with at least one other computer or at least one remote input device further comprising sufficient hardware, software, accessories and peripheral devices; word processing (or spreadsheet) software with preconfigured forms for input of Vehicle Provider, End User and other optional entities' data to generate output of the DFSL document package and Duty/Tax Free Certificate via a printer, facsimile, cell phone, smart phone and/or email or other tangible form.

Or, the invention may be practiced with a computer system (server) further comprising sufficient hardware, software (WWW browser and/or email program), accessories and peripheral devices based at an Internet Service Provider (ISP) location in communication via the Internet and/or World Wide Web (WWW) via HTTP from the server to a client or with other computers or other remote input devices comprising sufficient hardware, software (WWW browser and/or email program), accessories and peripheral devices, and HTML or XML electronic preconfigured forms for input of Vehicle Provider, End User and other optional entities' data to generate output of the DFSL document package and Duty/Tax Free Certificate via a printer, facsimile, cell phone, smart phone, email or any other type of electronic communications (either wired or wireless) or other tangible form. All components of the above-mentioned system are well known in the art.

Alternately, data may be transferred between the parties on the Internet and/or World Wide Web (WWW) via HTTP by a "cookie." Passed to a web browser from a web server, a cookie is a data structure provided as part of the HTTP and TCP/IP protocol. Other protocols such as ATM, SNA, DECNET or any other suitable protocols may be used.

As a process or method, the invention may be practiced by an operator (such as Vehicle Provider) comprising the following steps:
a) receiving or causing to be received an inquiry from a Tax Exempt Entity (TEE);
b) verifying or receiving verification that the inquiry is a TEE;
c) allowing or causing to allow the TEE to select the vehicle/product/good to be used and duration of use desired from the operator;
d) receiving or causing to be received a provisional offer from the TEE to enter into a Duty Free Synthetic Lease (DFSL) with the operator for the vehicle/good/product selected in step c above;
e) accepting or causing to be accepted the provisional offer from the TEE;
f) calculating or receiving a calculation of the actual use fee(s) to be paid by the TEE to the operator over the period of use;
g) communicating or causing to be communicated to the TEE the actual use fee(s) determined in step f above;
h) receiving or causing to be received a firm offer from the TEE based on the actual use fee determined in step f above;
i) accepting or causing to be accepted by the operator the firm offer from the TEE;
j) generating or causing to be generated by the operator the DSFL document package including the Duty/Tax Free Certificate;
k) transmitting or causing to be transmitted the DSFL document package and Duty/Tax Free Certificate to the TEE for signature(s) indicating legally enforceable acceptance of the DFSL;
l) receiving or causing to be received the executed document package with payment from the TEE;
m) transferring or causing to transfer title of the vehicle/product/good to the TEE;
n) delivering or causing to be delivered to the TEE the Tax/Duty Free Certificate and executed copies of the DSFL document package;
o) delivering or causing to be delivered the vehicle/product/good to the TEE for use in compliance with the DFSL.

The above process or method may further comprise:
p) receiving or causing to be received periodic payments from the TEE for using the vehicle/product/good for the duration of use;
q) receiving or causing to be received the vehicle/product/good from the TEE at the end of the use period.

Versions of the device, system and method disclosed herein may also be used as a simulation game for amusement purposes.

As will be apparent to persons skilled in the art, such as an importer in the global import/export industry, computer programmer or other similar-type individuals, various modifications and adaptations of the structure and method of use above-described will become readily apparent without departure from the spirit and scope of the invention, the scope of which is defined in the future claims. Although the foregoing invention has been described in detail by way of illustration and example, it will be understood that the present invention is not limited to the particular description and specific embodiments described but may comprise any combination of the above elements and variations thereof, many of which will be obvious to those skilled in the art. Additionally, the acts and actions of fabricating, assembling, using, and maintaining the preferred embodiment of this invention is well known by those skilled in the art. The invention may be embodied in other specific forms without departing from the spirit or essential characteristics thereof. The present embodiment is therefore to be considered in all respects as illustrative and not restrictive, the scope of the invention being indicated by the future claims rather than by the foregoing description, and all changes which come within the meaning and range of equivalency of the future claims are therefore intended to be embraced therein.

What is claimed is:

1. A machine consisting of:
a) a computer comprising sufficient hardware, software, peripherals, necessities and/or accessories for transformation of data, programmed to perform the following process, the process consisting of;
b) receiving or causing to be received by processor of the computer an inquiry from a Tax Exempt Entity, identified as acronym TEE;
c) verifying, receiving verification or causing to be verified by the processor of the computer, that the inquiry is a TEE;
d) allowing or causing to allow the TEE to select the vehicle/product/good to be used and duration of use desired from the operator of the computer;
e) receiving or causing to be received by the processor of the computer a provisional offer from the TEE to enter into a Duty Free Synthetic Lease, identified as acronym DFSL, with the processor of the computer for the vehicle/good/product selected in step (e) above;
f) accepting or causing to be accepted the provisional offer from the TEE by the processor of the computer;
g) calculating or receiving a calculation of the actual use fee or fees to be paid by the TEE to the processor of the computer over the period of use;
h) communicating or causing to be communicated to the TEE by the processor of the computer the actual use fee or fees determined in step (g) above;
i) receiving or causing to be received by the processor of the computer a firm offer from the TEE based on the actual use fee determined in step (h) above;
j) accepting or causing to be accepted by the processor of the computer the firm offer from the TEE;
k) generating by the processor of the computer the DSFL document package including a Duty/Tax Free Certificate, a Master Use and Service Agreement for Motor Vehicles, a Vehicle Return Condition Agreement, a Maintenance Service Agreement, an Overseas Loss/Damage Motor Insurance Certificate, a Registration Book for Private Vehicle, a Transfer of Ownership of Motor Vehicle or Trailer, a New/Used Unit Delivery Note, and a Comprehensive Cover;

l) generating and displaying by the processor of the computer the DSFL document package and Duty/Tax Free Certificate to the TEE for at least one signature indicating legally enforceable acceptance of the DFSL;

m) receiving or causing to be received by the processor of the computer the executed document package with payment from the TEE;

n) transferring or causing to transfer the title by the processor of the computer of the vehicle/product/good to the TEE;

o) delivering or causing to be delivered by the processor of the computer to the TEE the Tax/Duty Free Certificate and executed copies of the DSFL document package;

p) generating by the processor of the computer the vehicle/product/good to the TEE for use in compliance with the DFSL;

q) receiving or causing to be received by the processor of the computer periodic payments from the TEE for using the vehicle/product/good for the duration of use;

r) receiving or causing to be received by the processor of the computer the vehicle/product/good from the TEE at the end of the use period.

2. A computer-implemented process for converting import tax and duty cost on at least one vehicle/product/good to a no-cost import tax and duty cost, the steps consisting of:

a) providing a computer comprising sufficient hardware, software, peripherals, necessities and/or accessories for transformation of data;

b) receiving or causing to be received by processor of the computer an inquiry from a Tax Exempt Entity, identified as acronym TEE;

c) verifying, receiving verification or causing to be verified by the processor of the computer, that the inquiry is a TEE;

d) allowing or causing to allow the TEE to select the vehicle/product/good to be used and duration of use desired from the processor of the computer;

e) receiving or causing to be received a provisional offer from the TEE to enter into a Duty Free Synthetic Lease, identified as acronym DFSL, with the processor of the computer for the vehicle/good/product selected in step (d) above;

f) accepting or causing to be accepted by the processor of the computer the provisional offer from the TEE;

g) calculating or receiving a calculation of the actual use fee or fees to be paid by the TEE to the processor of the computer over the period of use;

h) communicating or causing to be communicated by the processor of the computer to the TEE the actual use fee or fees determined in step (g) above;

i) receiving or causing to be received by the processor of the computer a firm offer from the TEE based on the actual use fee determined in step (f) above;

j) accepting or causing to be accepted by the processor of the computer the firm offer from the TEE;

k) generating by the processor of the computer the DSFL document package including a Duty/Tax Free Certificate, a Master Use and Service Agreement for Motor Vehicles, a Vehicle Return Condition Agreement, a Maintenance Service Agreement, an Overseas Loss/Damage Motor Insurance Certificate, a Registration Book for Private Vehicle, a Transfer of Ownership of Motor Vehicle or Trailer, a New/Used Unit Delivery Note, and a Comprehensive Cover;

l) transmitting or causing to be transmitted by the processor of the computer the DSFL document package and Duty/Tax Free Certificate to the TEE for at least one signature indicating legally enforceable acceptance of the DFSL;

m) receiving or causing to be received by the processor of the computer the executed document package with payment from the TEE;

n) transferring or causing to transfer of title of the vehicle/product/good by the processor of the computer to the TEE;

o) delivering or causing to be delivered by the processor of the computer to the TEE the Tax/Duty Free Certificate and executed copies of the DSFL document package;

p) processing the vehicle/product/good by the processor of the computer to the TEE for use in compliance with the DFSL;

q) receiving or causing to be received by the processor of the computer periodic payments from the TEE for using the vehicle/product/good for the duration of use;

r) receiving or causing to be received by the processor of the computer the vehicle/product/good from the TEE at the end of the use period.

3. A computer-implemented process for converting import tax and duty cost on at least one vehicle/product/good from a taxable entity to a no-cost import tax and duty cost for a Tax Exempt Entity, identified as acronym TEE, the steps consisting of:

providing a computer comprising sufficient hardware, software, peripherals, necessities and/or accessories for transformation of data;

processing unique information concerning import tariff, duty and/or tax information on at least one vehicle/product/good for a desired country in the world and extracting import tariff, duty and/or tax information on at least one vehicle/product/good for a desired country in the world for a taxable entity from a database;

processing unique information about a Tax Exempt Entity, identified as acronym TEE;

processing the information for the financial consequences of converting the given import tariff, duty and/or tax information on at least one vehicle/product/good for a desired country by a taxable entity and, for comparison, generating and displaying by the computer (a) the import taxes avoided by using the TEE to hold title of the vehicle/product/good prior to importation of the vehicle/product/good into the desired country, and generating and displaying by the computer (b) the lease taxes avoided by using the TEE to hold title of the vehicle/product/good prior to importation of the vehicle/product/good into the desired country subject to a vehicle/product/good use agreement, and generating and displaying by the computer (c) the income taxes avoided by the taxable entity by using the TEE to hold title of the vehicle/product/good after importation of the vehicle/product/good into the desired country subject to a vehicle/product/good use agreement, and for comparison, generating and displaying by the computer (d) the total taxes avoided by the taxable entity by using the TEE to hold title of the vehicle/product/good after importation of the vehicle/product/good into the desired country subject to a proposed vehicle/product/good use agreement, and, if accepted by the TEE, generating by the computer via an output means a document package including at least one vehicle/product/good use agreement, at least one NOTICE OF ASSIGNEMENT ASSIGNING THE LEGAL RIGHTS OF THE VEHICLE/PRODUCT/GOOD TO A BANK AND/OR A VEHICLE/PRODUCT/GOOD PROVIDER, at least one vehicle/product/good return conditions form, at least one Fleet Service Contract, at least one Insurance Policy for the vehicle/good/product, at least one Original Log book of the vehicle/good/product, at least one Signed Transfer Form for the vehicle/product/good log book, at least one Signed Delivery Note, and, at least one Duty/Tax Free Certificate and generating by the computer optional additional documentation to cover service and maintenance extra charges and procedures in remote areas of use of the vehicle/good/product.

4. A computer program product, consisting of a non-transitory computer usable medium having a computer readable program code embedded therein, said computer readable program code adapted to implement a method for generating a document package for avoiding import duty and/or taxes of a vehicle/good/product provider for the transfer of title into a Tax Exempt Entity, identified as acronym TEE, prior to importation to a desired country in the world, the title transfer also comprising a document package resulting in a Duty/Tax Free Certificate identifying the tax-free legal status of the importation, use and income of the vehicle/good/product, the method performed at least in part within a signal processing device and consisting of:

providing a non-transitory computer usable medium consisting of sufficient hardware, software, peripherals, necessities and/or accessories for transformation of data;

transferring title from a taxable vehicle/good/product provider entity in a Free Trade Zone to a Tax Exempt Entity, identified as acronym TEE;

generating via a document package including at least one vehicle/product/good use agreement, at least one NOTICE OF ASSIGNEMENT ASSIGNING THE LEGAL RIGHTS OF THE VEHICLE/PRODUCT/GOOD TO A BANK AND/OR A VEHICLE/PRODUCT/GOOD PROVIDER, at least one vehicle/product/good return conditions form, at least one Fleet Service Contract, at least one Insurance Policy for the vehicle/good/product, at least one Original Log book of the vehicle/good/product, at least one Signed Transfer Form for the vehicle/product/good log book, at least one Signed Delivery Note, and, at least one Duty/Tax Free Certificate;

importing the vehicle/product/good with the TEE in title of the vehicle/product/good;

using the vehicle/product/good by the TEE;

paying the vehicle/product/good provider a fee for using the vehicle/product/good free of taxes, and;

depositing the extra profit generated by the title transfer from the vehicle/product/good provider to the TEE prior to importation into a desired country in cash into a bank account for the benefit of the vehicle/product/good provider.

* * * * *